United States Patent [19]

Spink et al.

[11] Patent Number: 5,364,604
[45] Date of Patent: * Nov. 15, 1994

[54] SOLUTE GAS-ABSORBING PROCEDURE

[75] Inventors: Donald R. Spink; Kim D. Nguyen, both of Waterloo, Canada

[73] Assignee: Turbotak Technologies Inc., Waterloo, Canada

[*] Notice: The portion of the term of this patent subsequent to Mar. 9, 2010 has been disclaimed.

[21] Appl. No.: 975,003

[22] Filed: Nov. 12, 1992

Related U.S. Application Data

[60] Continuation-in-part of Ser. No. 754,643, Sep. 4, 1991, which is a continuation-in-part of Ser. No. 646,197, Jan. 28, 1991, Pat. No. 5,192,517, which is a continuation-in-part of Ser. No. 438,047, Nov. 20, 1989, Pat. No. 5,023,064, which is a division of Ser. No. 243,720, Sep. 13, 1988, Pat. No. 4,963,329, which is a continuation-in-part of Ser. No. 20,953, Mar. 2, 1987, Pat. No. 4,865,817.

[30] Foreign Application Priority Data

Nov. 12, 1991 [GB] United Kingdom ............ 9123999.6

[51] Int. Cl.$^5$ .......................... C01B 7/01; C01B 17/16; C01B 17/48; C01B 21/20
[52] U.S. Cl. ...................................... 423/210; 95/187; 95/199; 423/220; 423/228; 423/235; 423/240 R; 423/241; 423/242.7; 423/243.08
[58] Field of Search ........... 423/243.08, 240 R, 242.7, 423/241, 22 8, 235, 220, 210; 95/187, 199

[56] References Cited

U.S. PATENT DOCUMENTS

| | | | |
|---|---|---|---|
| 1,132,679 | 3/1915 | Murray et al. | 423/242 A |
| 3,647,360 | 3/1972 | Taeger | 422/168 |
| 3,764,654 | 10/1973 | Shah | 423/242 A |
| 3,852,408 | 12/1974 | Ewan et al. | 423/242 A |
| 4,067,703 | 1/1978 | Dullien et al. | 55/92 |
| 4,272,499 | 6/1981 | Cason et al. | 423/242 |
| 4,366,132 | 12/1982 | Holter et al. | 422/169 |
| 4,374,813 | 2/1983 | Chen et al. | 423/243.08 |
| 4,484,937 | 11/1984 | James et al. | 55/223 |
| 4,530,822 | 7/1985 | Ashley et al. | 423/242 |
| 4,708,855 | 11/1987 | Morrison | 422/168 |
| 4,762,686 | 8/1988 | Lehto | 422/16 8 |
| 4,783,326 | 11/1988 | Srednicki | 423/240 |
| 4,818,256 | 4/1989 | Ross | 422/168 |
| 4,865,817 | 9/1989 | Burgess et al. | 422/168 |
| 4,893,752 | 1/1990 | Spink et al. | 239/427.3 |
| 4,963,329 | 10/1990 | Burgess et al. | 422/168 |
| 5,019,361 | 5/1991 | Hakka | 423/243 |
| 5,023,064 | 1/1991 | Burgess et al. | 423/242 |
| 5,108,551 | 4/1992 | Yan | 423/240 |
| 5,192,517 | 3/1993 | Spink | 423/243.08 |

FOREIGN PATENT DOCUMENTS

0303501 2/1989 European Pat. Off. .

*Primary Examiner*—Wayne Langel
*Attorney, Agent, or Firm*—Sim & McBurney

[57] ABSTRACT

A solute gas absorbing procedure employs a parallel flow of liquid absorbing medium to dual-fluid spray nozzles from which are formed fine droplet sprays in which the solute gas is absorbed. The invention is particularly applicable to the removal of acid gases, such as $SO_2$, using regenerable aqueous alkaline absorbing media, such as amines or amine salts.

13 Claims, 6 Drawing Sheets

FIG.1.

FIG.2.

TWO STAGE PARALLEL FLOW, IN SERIES, 4 NOZZLE SPRAY

SOLUTE GAS-ABSORBING PROCEDURE

REFERENCE TO RELATED APPLICATION

This application is a continuation-in-part of copending U.S. patent application Ser. No. 754,643 filed Sep. 4, 1991, pending which itself is a continuation-in-part of copending U.S. patent application Ser. No. 646,197 filed Jan. 28, 1991 (now U.S. Pat. No. 5,192,517), which itself a is a continuation-in-part of U.S. Ser. No. 438,047 filed Nov. 20, 1989 (now U.S. Pat. No. 5,023,064, which itself is a division of U.S. patent application Ser. No. 243,720 filed Sep. 13, 1988 (now U.S. Pat. No. 4,963,329), which itself is a continuation-in-part of U.S. patent application Ser. No. 020,953 filed Mar. 2, 1987 (Now U.S. Pat. No. 4,865,817).

FIELD OF INVENTION

The present invention relates to a solute gas-absorbing procedure for removal of a solute gas from a gas stream by contact with very small liquid droplets of absorbing medium.

BACKGROUND TO THE INVENTION

We have previously described, for example, in U.S. Pat. Nos. 5,023,064, 4,963,329 and 4,865,817, assigned to the assignee hereof and the disclosures of which are incorporated herein by reference, treatment of gas streams to remove components therefrom, wherein multiple two-phase nozzles located in a horizontal conduit are used to form sprays of fine liquid droplets of absorbing medium contacting the gas stream to absorb a solute gas from the gas stream and a fan is used to coalesce the liquid droplets at the downstream end. In a situation where low levels of particulate material contaminate the gas stream, an agglomerator fan is not necessary and conventional entrainment equipment can be used, as described in copending U.S. patent application Ser. No. 754,643 filed Sep. 4, 1991, assigned to the assignee hereof and the disclosure of which is incorporated herein by reference.

In present practices, the absorption of a solute gas from a gas mixture using a liquid or slurry sorbent is conducted in a continuous flow counter-current fashion. The type of equipment employed is normally a vertical tower containing either packing or trays that enhance the gas-liquid contact surface area. In some instances, for example where liquid slurries form the sorbent phase, open spray towers are used. These spray towers usually generate large droplet sizes, generally at least about 700 $\mu$m, to avoid elutriation of the liquid with the gas stream exiting at the top of the column. The solute-containing gas stream is introduced at the bottom of the tower while the scrubbing liquor is introduced at the top of the tower so as to effect counter-current contact. As a consequence of this design, the solute-depleted gas phase is contacted with the lean sorbent at the top of the tower while "loaded" sorbent is in contact with the solute rich gas phase at the bottom of the tower.

Such counter-current contact promotes high levels of removal of the solute gas from the gas stream while producing a "loaded" sorbent stream, assuming that the tower height or the number of theoretical equilibrium stages is adequate. Mass transfer of the solute gas to the liquid sorbent phase is dependent on a number of parameters, the most important of which is the surface area of the liquid exposed to the gas phase. There are many classical approaches to increasing this so-called contact area reported in the literature. For example, the surface area developed by most packed-beds generally averages around 500 ft$^2$ per US gallon of liquid introduced over the packing via a proper distributor. In recent years, "new" packings have been developed which reportedly increase this area by 20%, but these materials only bring the contact area to approximately 600 ft$^2$ per gal of liquid.

Two-phase atomizing nozzles as described in U.S. Pat. No. 4,893,752, assigned to the assignee hereof and the disclosure of which is incorporated herein by reference, produce sprays of small droplets that create large numbers of droplets from each gallon sprayed (50 trillion droplets at 5 $\mu$m) and consequently very large surface areas. This technology has been applied to induct gas-liquid contact where the potential was demonstrated to generate as much as about 50,000 ft$^2$ per US gallon of liquid sprayed. Aqueous solutions of organic amines that selectively chemisorbed sulfur dioxide (SO$_2$) from off-gas streams have been sprayed in a series of consecutive stages in counter-current scrubbing and SO$_2$ removal efficiencies up to 99% have been achieved, as described in the aforementioned U.S. patent application Ser. No. 754,643. In the arrangement described in this prior application, an entrainment separator is located downstream of each nozzle, so that each nozzle, in effect, is located in its own individual compartment, and the amine solution is passed serially to each nozzle, countercurrent to the direction of flow of the gas stream so that a SO$_2$-depleted gas stream is exposed to the lean absorbing medium and a partially-loaded absorbing medium is exposed to an increasingly rich gas stream containing SO$_2$.

Experimental runs showed that the above-described counter-current chemisorption with interstage entrainment separation provided good SO$_2$ removal while attaining good loading of the absorbent. An apparent drawback of this arrangement is the necessity of spraying the full stream of liquid absorbent sequentially to each of the stages so established which, in effect, results firstly in the consumption of fairly large quantities of compressed air used in the two-phase atomizing nozzles and secondly to the necessity of using one pump for each stage. One novel approach to decrease the consumption of air would be to split the full stream of liquid sorbent into separate streams for each stage, creating parallel flow using only one pump to distribute the appropriate amount of liquor to each nozzle. Consequently, the total process compressed air required for liquid atomization at each nozzle is reduced proportionately to the amount of liquid pumped.

SUMMARY OF INVENTION

It now has been found that a highly-efficient removal of solute gases, for example, sulfur dioxide, particularly by chemisorption in a regenerable aqueous absorbing medium, can be achieved by locating two or more two-phase atomizing spray nozzles in a duct and spraying lean aqueous absorbing medium, such as an amine solution for chemisorption of sulfur dioxide, from each nozzle in parallel flow, with the distribution of the absorbing medium to each of the nozzles being optimized with respect to the degree of solute gas removal required in the duct.

Accordingly, in one aspect of the present invention, there is provided a method for the removal of a solute gas from a gas stream containing the same, using an absorbing medium from the solute gas, which comprising passing the gas stream through an elongate conduit having an inlet thereto and an outlet therefrom; feeding the absorbing medium in parallel to at least two dual-fluid spray nozzles located in longitudinally spaced-apart relationship in the conduit; injecting the parallel-fed absorbing medium from each of spray nozzles by atomizing gas to form a spray pattern of the absorbing medium in the conduit from each nozzle and containing liquid droplets ranging in size from about 5 to about 150 microns; absorbing solute gas from the gas stream into the liquid droplets in each the spray pattern in the conduit; and agglomerating the liquid droplets containing absorbed solute gas at the outlet of the conduit to remove entrained liquid droplets from the gas stream and form a liquid stream containing absorbed solute gas.

BRIEF DESCRIPTION OF DRAWINGS

FIG. 1 is a schematic representation of a scrubbing apparatus provided in accordance with one aspect of the invention;

FIG. 2 is a schematic representation of a scrubbing apparatus provided in accordance with another aspect of the invention;

FIG. 3 is a schematic representation of a scrubbing apparatus provided in accordance with a further aspect of the invention;

FIG. 4 is a schematic representation of a scrubbing apparatus provided in accordance with an additional aspect of the invention;

FIG. 5 is a graphical representation of the variation of scrubbing efficiency with liquid/gas ratio for absorption of $SO_2$ using an aqueous amine solution in parallel flows; and FIG. 6 is a graphical representation of the variation of $SO_2$ efficiency removal with inlet gas concentration using an aqueous amine solution in parallel flows.

GENERAL DESCRIPTION OF INVENTION

In the duct through which the solute gas-containing stream flows, the lean aqueous regenerable absorbing medium is finely atomized by nonplugging, two-phase nozzles, which are, preferably, centrally disposed and which are longitudinally spaced apart in the conduit to form three or more contact spray zones containing liquid spray droplets in the range about 5 to about 150 microns, more usually about 30 to 60 microns. By spraying the liquid absorbing medium into a suitable elongate conduit using suitable nozzles, a tremendous number of droplets are generated in the form of a spray along with very high surface areas. For example, if only 5 micron droplets are generated, each kilogram of water yields about $1.5\times10^{13}$ droplets which have a surface area of about 1200 square meters (approximately 13,000 sq ft/kg). On the other hand, in a traditional FGD system, where roughly 1000 micron droplets are generated, each kilogram of water yields about $1.9\times10^{6}$ droplets which have a surface area of about 6 square meters. The surface area values achieved using the two-phase nozzles, as shown above, are by orders of magnitude greater than generated by the commercially-available devices presently used for this service. Since the mass transfer that a given dispersion can produce is often proportional to droplet diameter, fine droplets are greatly favoured in the absorption of a solute gas into a liquid-reacting medium.

The droplets ejected from each two-phase nozzle may agglomerate with each other and/or coalesce on the duct walls to some extent, which may result in their removal from the gas streams, either before or after the next nozzle stage. The distance between the nozzles is adjusted so that absorption efficiency is maximized for a particular system. Achieving such efficiency normally is a function of the concentration of the solute gas, gas flow rate (velocity), reactivity of the absorber liquid, L/G, nozzle design, air pressure (to nozzle), droplet size, etc. Liquid droplets that remain entrained do not significantly affect the reaction kinetics of the next stage and are removed at the downstream end of the duct by an entrainment separator or other static demister.

An advantage of the parallel flow arrangement described herein is an ability to provide spray zones of uniform density and, therefore, to yield even gas distribution due to the nozzles being coaxially spaced apart in series within the duct. The spray zones completely cover the cross sectional area of the duct and yet without overlapping one another, thereby providing good gas and liquid distribution even under upset conditions associated with a nozzle failure.

Either co-current or counter-current sprays may be employed. When counter-current sprays are used, a much smaller spray angle is used as the fine spray tends to mushroom out as it meets the resistance of the gas flow. When spraying co-current, a larger spray angle is used which, depending on the gas velocity, tends to be reduced to give a more dense spray. Nevertheless, multiple orifice (cluster) nozzles are preferred for spraying co-current to the gas flow so as to provide the highest density of droplets across the cross-section of the duct. By its inherent nature, co-current spraying may be favoured in gas-liquid transfer situations whereby a longer residence time for the gaseous solute with the liquid-reacting-medium is required. Parallel spraying techniques using co-current sprays in this case serve to achieve equilibrium liquid loading in fewer stages thereby reduce the footprint and capital cost of the scrubber. When co-current spraying is employed, to achieve a more uniform density of spray, multi-orifice nozzles are employed that may use twenty or more individual orifices. Obviously, combinations of co-current and counter-current sprays also can be employed in special situations whereby more than one gaseous contaminant is to be removed using more than one liquid reacting medium.

The distribution of spray zones is preferably achieved with a unique two-phase, atomizing spray nozzle design that has precise gas-liquid mixture control and thereby allows for the flexibility required to control size and number of droplets necessary for efficient removal of solute gases. Such two-phase spray nozzle designs are described in the aforementioned U.S. Pat. No. 4,893,752 and in published International Patent application No. WO92/04127, assigned to the assignee hereof and the disclosure of which is incorporated herein by reference. The two-phase spray nozzles generally operate at about 20 to about 100 psi, usually at about 20 to about 70 psi, preferably about 25 to about 55 psi. Individual nozzles can be designed to deliver from a fraction of one gpm to in excess of 300 gpm.

As another variant of the process, some of the lightly-loaded absorbent may be introduced in parallel flow to nozzles located further up-stream where contact with the higher concentrations of solute gases exists. Thus, a compromise between counter-current stage-wise nonparallel operation and a strict parallel flow operation can be achieved by a combination of both procedures. For example, parallel flow of lean absorbent may be to two or three nozzles sequentially located in the scrubbing duct, the collected liquor coalesced from all nozzles is pumped to a second set of two or three nozzles in parallel flow further up-stream where a higher concentration of the solute gas exists. A suitable mist eliminator separates the two nozzle sets. The liquid collected at the intermediate mist eliminator represents the loaded absorbent, which, when regenerable, can be further processed to strip out the absorbed solute gas, after which the absorbent is cooled and then pumped to the first set of absorbent nozzles in parallel flow.

For the purpose of effecting the process of the invention, the multiple two-phase atomizing nozzles may be located in a horizontally-directed conduit, a vertically-directed conduit, an angularly-located conduit, or any combination of orientations, as desired. The vertically-directed conduit may be a vertical duct or a vertical tower similar to those presently used throughout the FGD industry. Advantages to vertical orientation are the positive effect of gravity, better drainage possible, minimum wall effect, longer residence time and the retrofit potential for using existing equipment. Since most of the small droplets introduced in the sprays are elutriated from the duct, an entrainment separator or other convenient device is provided at a downstream end of the duct to remove and recover loaded liquid droplets from the gas stream, before the latter is vented. It is less practical to employ the combination of parallel flow coupled with staged flow as described above for vertically-oriented absorption, especially for very large towers, i.e. those greater than 20' diameter, due to inherent problems perceived in effecting interstage coalescing and collection of the coalesced liquor. However, one possible approach is to introduce the lean sorbent solution to the tower at three or more nozzles in parallel flow and to introduce the partially-loaded liquor collected from the downstream mist eliminator in parallel flow to three or more nozzles placed in a horizontally-oriented entrance duct to the tower. A mist eliminator is positioned downstream of the latter nozzles but before the gaseous entrance to the tower to remove the loaded sorbent for forwarding to a stripping step.

The present invention broadly relates to the removal of a solute gas from a gas stream using some form of liquid scrubbing medium in which at least one solute gas is absorbed or chemisorbed. Preferably, the scrubbing medium is a regenerable aqueous medium which the solute gas is absorbed and subsequently desorbed. The invention is particularly illustrated with respect to gas streams containing sulfur dioxide, with or without attendant particulate material, but the principles thereof are broadly applicable to a variety of situations where it is desirable to remove a single component from a gas stream prior to its discharge. As described below, the solute gas component of the gas stream usually is an acid gas, including $SO_2$, $H_2S$, $Cl_2$, $ClO_2$, $NO_x$, HCl, HF, $SO_3$ and $CO_2$. With such said gas components, suitable regenerable aqueous absorbing media include aqueous amine solutions, as described in more detail below.

One important application of the present invention is to the removal of bleach plant emissions from a bleached pulp mill. Such emissions, primarily chlorine and chlorine dioxide, may be treated in multiple stages of parallel flow with a suitable scrubbing solution which removes the chlorine and which reduces the chlorine dioxide and neutralizes the resulting acids. Suitable scrubbing solutions include pulp mill E filtrate, weak wash, white liquor or mixtures.

Another important application of the present invention is to the removal of odiferous components, mainly in the form of various sulfur compounds, from gas streams arising in pulp mill recovery boilers, in sewage treatment plants, meat rendering plants and the like, by use of a suitable scrubbing medium applied in multiple stages of parallel flow.

A further application of the present invention is to the removal of acid gases, such as hydrogen sulfide and carbon dioxide, from various gas streams, using aqueous alkanolamine solutions. Gas streams containing one or both gaseous components arise from various sources, including natural gas plants, refineries, ammonia synthesis units and hydrogen plants. Suitable alkanolamines which may be used include monoethanolamine, diethanolamine, diglycolamine, diisopropylamine and methyldiethanolamine.

Other acidic gas streams containing, for example, HCl or $SO_3$, may be treated with a suitable reacting medium for the solute gas. In addition, gas streams containing $NO_x$ gases may be treated by the process of the invention to remove the same therefrom using suitable reagents.

Removal of $SO_2$ from gas streams may be effected by contacting the gas stream with a suitable scrubbing medium. For example, the scrubbing medium may be an aqueous alkaline medium, such as an aqueous alkaline slurry medium, for example, a limestone slurry in which the absorbed $SO_2$ reacts with the limestone. Alternatively, the reacting medium may be a metal oxide-based slurry medium, for example, a calcium, zinc or magnesium oxide slurry in which the absorbed $SO_2$ reacts with the metal oxides to form corresponding sulfites.

Another class of absorbing medium which may be used with $SO_2$ is one in which $SO_2$ is reversibly soluble, such as a solution of an amine, diamine or monosalt of a diamine solution. Suitable materials are described, for example, in U.S. Pat. No. 5,019,361 assigned to Union Carbide Canada Limited and published European patent application No. 0303501 assigned to Dow Chemical Company, the disclosures of which are incorporated herein by reference.

When such reversible absorbing media are employed for absorption of $SO_2$ or other solute gases, the degree of loading of the medium by absorbed gas may be very high. This effect permits the process of the invention to operate at lower liquid-to-gas ratios (L/G) than other presently-practised solute gas removal procedures.

The arrangement of the present invention, wherein parallel flow of lean regenerable absorbing medium to the two-phase nozzles is effected, gives rise to several advantages over the prior serial flow system described in the aforementioned USSN 754,643, for example:

1. Assuming a constant L/G ratio applies to the amount of lean absorbent employed in both arrangements, then a three-stage counter-current staged system uses three pumps, whereas only a single pump is required with the parallel flow procedure of the invention, consumes three times the quantity of compressed air required for the parallel flow procedure of the invention, and consumes three times as much power as the parallel flow procedure of the present invention.
2. Only a single loaded amine or other regenerable solvent receiving tank is required with the parallel amine solution flow process, compared to three tanks for the staged counter-current flow approach.

3. No interstage entrainment separators are required with the parallel flow procedure of the present invention, resulting in a saving in capital cost and the elimination of the related pressure drop.
4. The lean amine solution or other regenerable solvent may be introduced to the duct in parallel flow in more than three nozzles, for example, six or eight in-duct nozzle locations. Such further nozzles add little to the overall capital cost of the absorber, in comparison to the large savings achieved, but permits optimization of the L/G ratio coupled with an overall higher loading of the amine.

The overall simplicity of the procedure of the invention using reactive absorbents for acidic gases significantly decreases capital and operating costs, while retaining high solute gas removal efficiency coupled with high loadings of solvent. As noted earlier and shown in the following Examples, the method of the present invention is broadly applicable to a wide range of solute gases and absorbing media.

DESCRIPTION OF PREFERRED EMBODIMENTS

Figure 1:
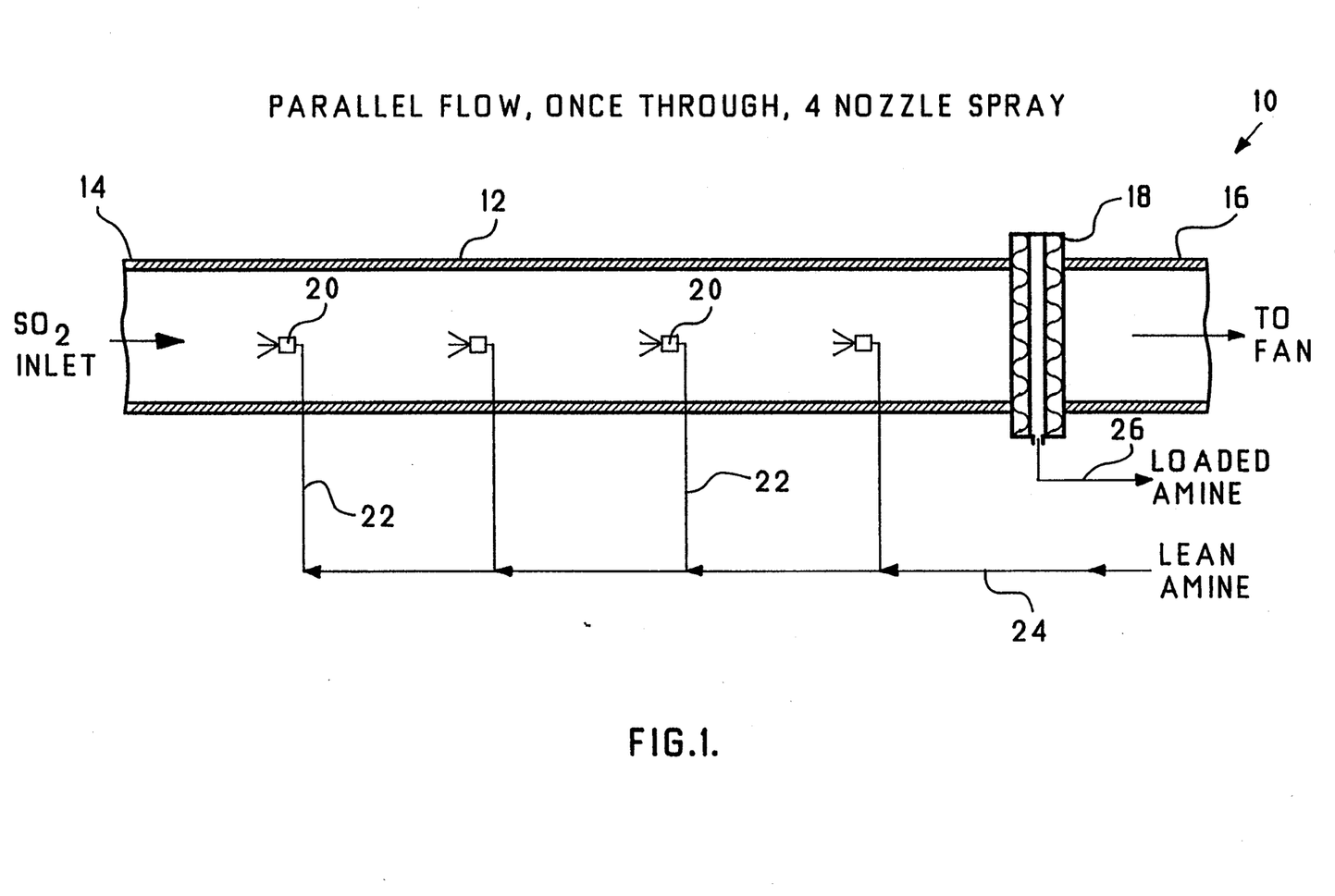

Referring first to FIG. 1, there is illustrated therein equipment 10 for an $SO_2$ absorption procedure comprising an elongate duct 12 having an upstream inlet 14 and a downstream outlet 16 connected to a fan (not shown) to draw an $SO_2$-containing gas stream through the duct 12 from the inlet 14 to the outlet 16. The duct 12 may have any desired cross-section, usually round or square. While the duct 12 is illustrated as being in a horizontal orientation, the duct also may be provided in a vertical orientation.

A demister 18 is provided adjacent the outlet 16 to remove entrained liquid droplets from the gas stream before the gas stream passes out of the duct 12. A plurality of dual-fluid spray nozzles 20 is provided in the duct 12, substantially equally spaced apart and generally located on the longitudinal axis of the duct 12, to form sprays of fine liquid droplets of absorbing medium in the duct 12.

The spray nozzles 20 are fed with lean aqueous amine solution fed in parallel flow by lines 22 from a single feed stream 24. As the sulfur dioxide in the inlet gas stream encounters the sprays of fine liquid droplets, the sulfur dioxide is chemisorbed by the amine. The $SO_2$-containing gas stream, emanating from any source thereof, usually is saturated with water vapor to avoid stripping of moisture from the amine solution. Upon agglomeration of the liquid droplets by the demister 18, a loaded amine solution is removed from the demister in line 26.

Figure 3:
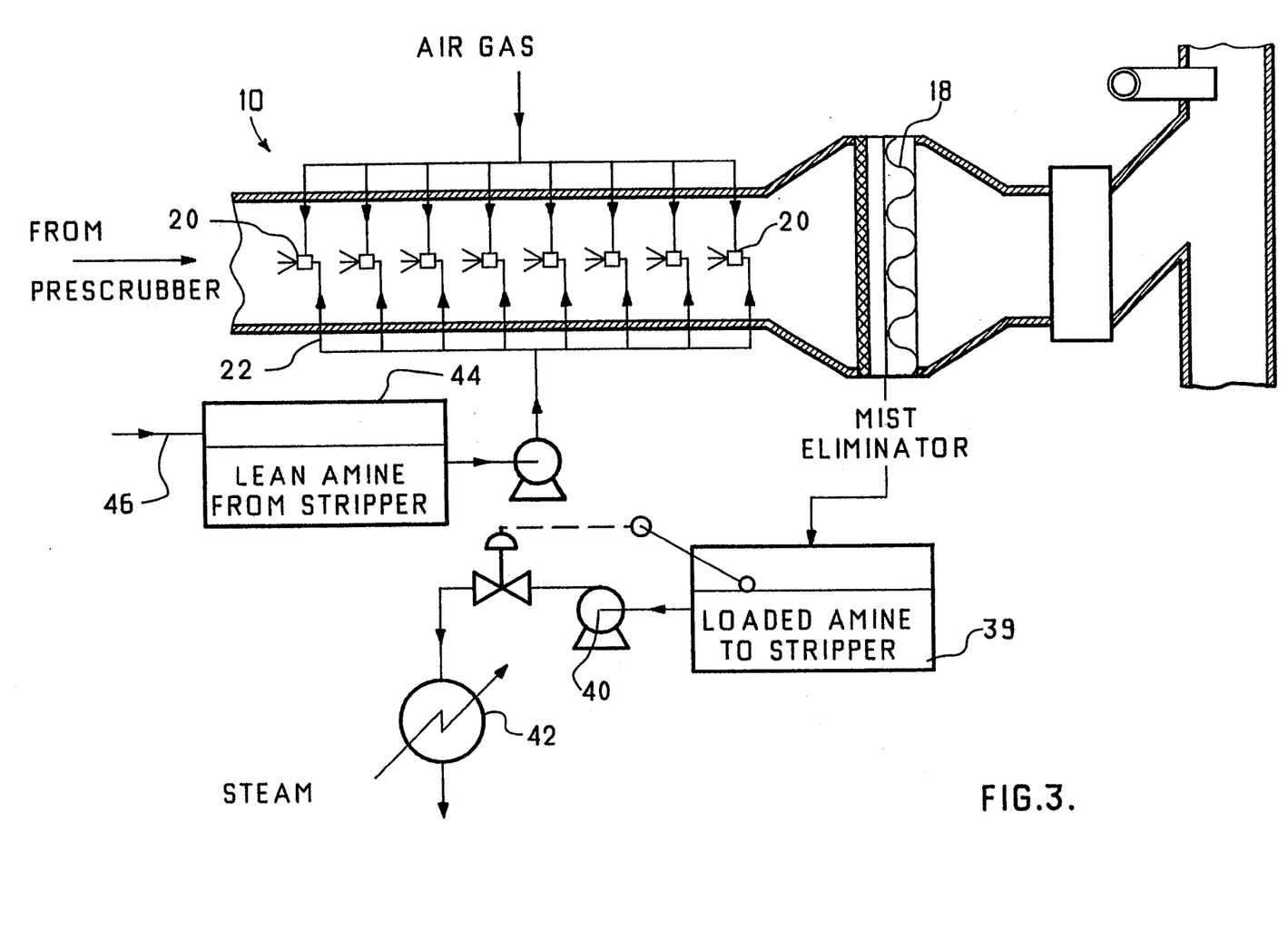

The loaded amine solution can be regenerated to strip the absorbed sulfur dioxide and the regenerated lean amine solution recycled is to the feed line 24, for example, as illustrated in FIG. 3 below.

In the embodiment illustrated in FIG. 1, four dual-fluid spray nozzles are illustrated as being employed to effect the spraying of the amine solution into the duct 12. However, any desired number of such spray nozzles may be employed, depending on the concentration of sulfur dioxide in the gas stream, the chemisorbtive capacity of the lean amine solution and the degree of desired removal of $SO_2$ from the gas stream.

Figure 2:
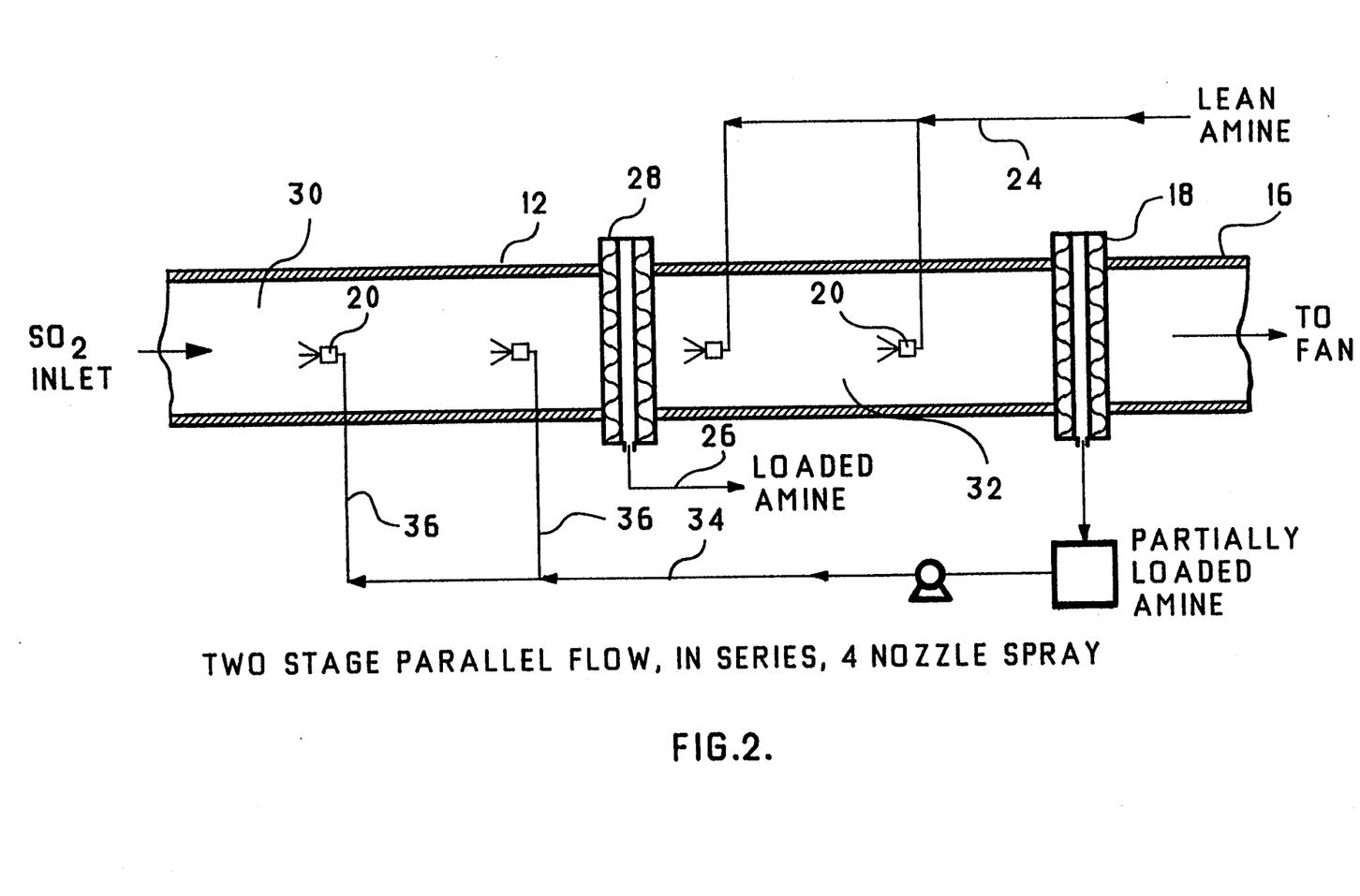

In FIG. 2, the dual fluid spray nozzles 20 are arranged in two pairs separated by a demister 28, which divides the conduit 12 into an upstream gas-absorbing zone 30 in which two of the nozzles 20 are located and a downstream gas-absorbing zone 32 in which the other two of the nozzles 20 are located.

In this embodiment, lean aqueous amine solution is fed in parallel by line 24 to the two nozzles 20 located in the downstream zone 32. Partially-loaded amine solution recovered in demister 18 is forwarded by line 34 to be fed in parallel by lines 36 to the nozzles 20 located in the upstream zone 30.

A loaded amine stream 26 is removed from the demister 28 for passage to a regeneration operation, if desired, to remove chemisorbed $SO_2$ and to form a regenerated lean aqueous amine solution to feed by line 24.

Turning to FIG. 3, there is illustrated an expanded version of the embodiment of FIG. 1, showing regeneration of the loaded amine solution. Where the gas stream to be treated is heavily contaminated with particulate material, it is preferred to effect a scrubbing pretreatment removal of such particulate material, such as disclosed in U.S. Pat. No. 5,023,064 referred to above. Such scrubbing operation has the advantage of removing water-soluble gases, such as HCl, $SO_3$ and $H_2SO_4$, and also saturates the gas stream with steam, which avoids removal of moisture from amine solution during contact of the gas stream in the duct 12 with the droplets.

Regeneration of loaded amine solution preferably is effected as described in published PCT application WO92/12786 assigned to the assignee hereof and the disclosure of which is incorporated herein by reference or by any other convenient procedure. For this purpose, the loaded amine from the mist eliminator 18 is collected in a loaded amine tank 38 from which it is pumped by pump 40 through heat exchanger 42 to a stripping operation. Lean amine from the stripping operation is received in a lean amine storage tank 44 by line 46.

Figure 4:
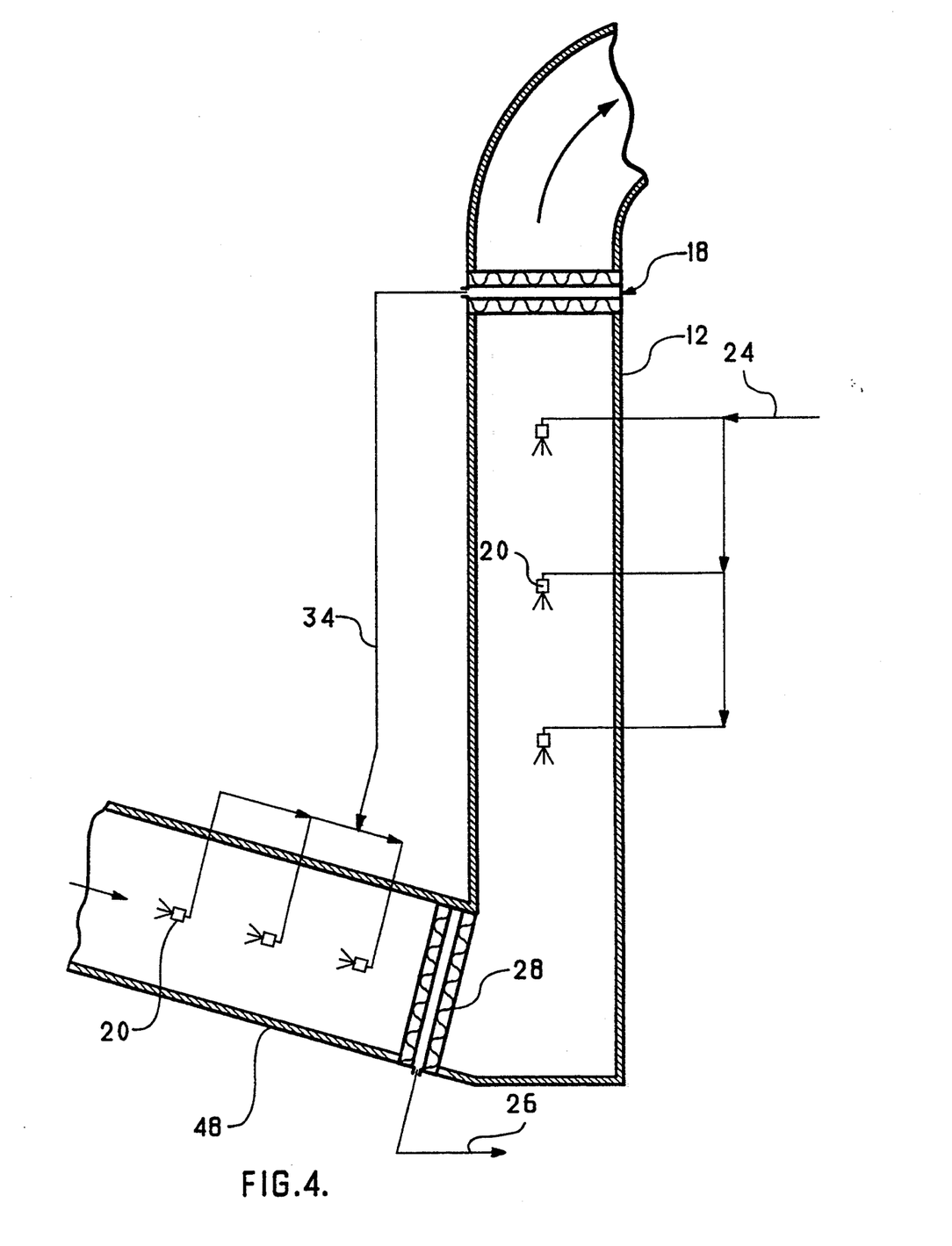

In FIG. 4, there is shown the conduit 12 in a vertical orientation for an upward gas flow therethrough. The dual-fluid spray nozzles 20, parallel fed with lean solvent, form downwardly-directed sprays countercurrent to the gas flow. An inlet conduit 48 for the gas stream also is provided with dual fluid spray nozzles 20. As in the embodiment of FIG. 2, partially-loaded solvent from the mist eliminator 18 is used as the feed to the nozzles 20 in the duct 48 and the fully-loaded solvent is recovered from the mist eliminator 28.

EXAMPLES

Example 1

In an experimental arrangement according to the present invention using three nozzles for removal of $SO_2$ using an amine solution, about one-half of the total lean amine solution was fed to the nozzle located at the rich $SO_2$ inlet end of the duct, about one-third of the total lean amine solution was fed to the middle nozzle and the remaining about one-sixth of the lean amine solution was fed to the nozzle farthest from the gas inlet. Under the conditions of this experiment, approximately 97% removal of the $SO_2$ was effected. In a second test, the distribution of amine to the nozzles then was reversed, resulting in very little change in $SO_2$ removal efficiency. In a third test, when an equal flow of the amine solution was delivered by each of the three nozzles, the best $SO_2$ removal efficiency was obtained.

The effect of the number of nozzles employed for parallel spraying of the amine solution gave the results set forth in the following Table I:

TABLE 1

Effect of Number of Nozzles on SC Removal Efficiency in Parallel Flow with a Fixed L/G ratio

| Sorbent | Gaseous contaminant | No. of Nozzles | Removal Efficiency (%) |
|---|---|---|---|
| Aqueous Amine | $SO_2$ | 1 | 60 to 81 |
| | | 2 | 92 |
| | | 3 | 95 to 97 |
| | | 4 | >98 |

From the results of the above-described tests, it was observed that the major variables affecting $SO_2$ removal efficiency are the liquid flow to each nozzle, the pressure of air and thus of liquid delivered to each nozzle, the overall liquid-to-gas (L/G) ratio (USG/1000 ft$^3$) and the number of nozzles used. Therefore, the overall removal efficiencies of a particular solute gas from a gas stream by the absorbing medium can be raised or lowered by adjustment of these variables to suit the particular situation. Most of the above results were obtained at 60 psig air pressure, roughly the same L/G ratios and nozzle sizing to give equivalent droplet size sprays.

For all the above-described parallel flow spraying tests, interstage entrainment separators were removed. The duct was sloped slightly downward so that all the coalesced liquor was removed at the end of the absorber section by a drain. Entrained absorbent was removed by an appropriate mist eliminator at the downstream end of the duct. As an alternative approach, parallel flow with interstage entrainment also may be desirable to evaluate the amount of loading of the absorbent produced by certain nozzles or nozzle combinations.

Example 2

This Example illustrates $SO_2$ removal using an amine with parallel flow.

Figure 5:
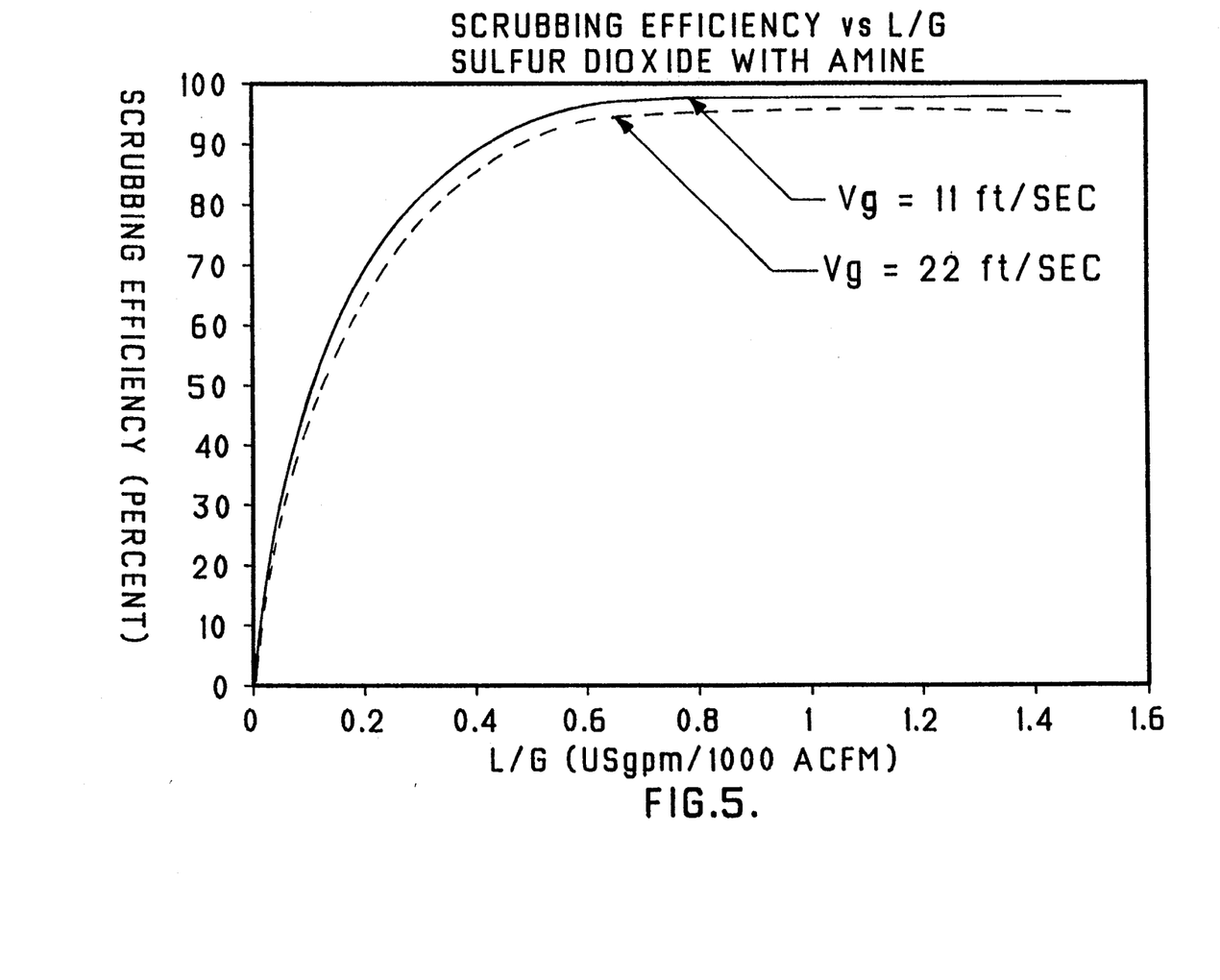
Figure 6:
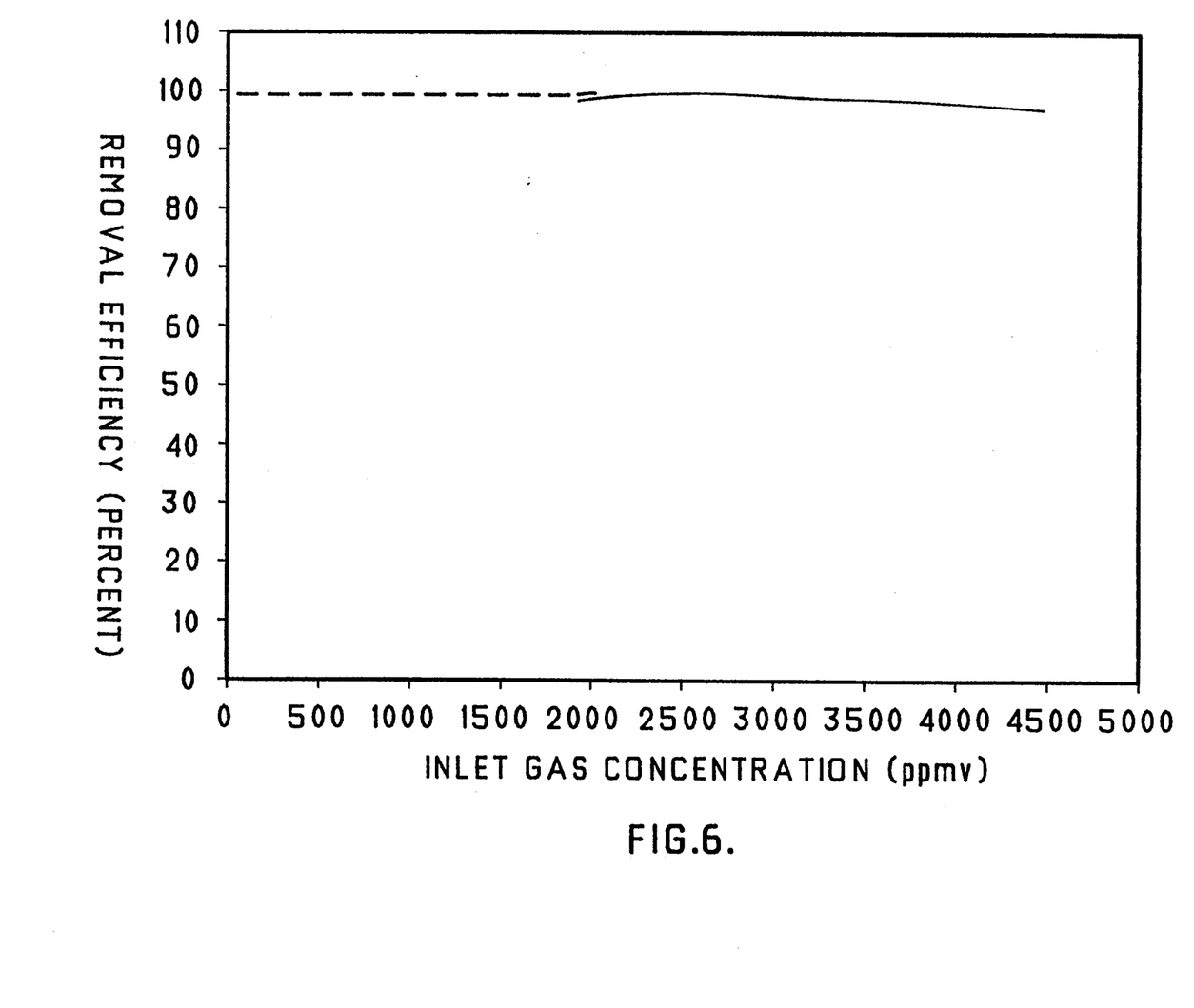

FIGS. 5 and 6 present the data from several series of experiments that illustrate the inherent flexibility of the specified amine system used. All experiments employed a fixed solution of the amine in water. Variables included concentration of $SO_2$ in the inlet gas, gas velocity in the duct, air pressure at the nozzles, number and size of nozzle used and L/G ratio. Variation of scrubbing efficiency with L/G were studied for two gas flow rates and the results presented in FIG. 5. FIG. 6 presents $SO_2$ removal efficiency against $SO_2$ inlet gas concentration for a fixed gas velocity and L/G.

Example 3

This Example illustrates removal of $SO_2$ using caustic (NaOH).

Acid-base reactions are kinetically very fast and thus surface dependent. Parallel flow in-duct contact with very fine sprays is an effective approach to such situations, i.e. $SO_2$/caustic, $SO_2$/amine, etc. systems. Stoichiometry of the caustic to the $SO_2$ can be controlled by pH so that pure $Na_2SO_3$, a mixture of $Na_2SO_3$ and $NaHSO_3$ and pure $NaHSO_3$ can be the final products wherein the ratio of sodium to $SO_2$ ranges from 2.0 to 1.0.

Tests using NaOH for removal of $SO_2$ were run in a continuous fashion under steady state conditions by the addition of fresh NaOH to the recirculating scrubber solution. The effluent pH was maintained at a pH level of 4.0 while the L/G ratio was 2.3 gal per 1000 ft$^3$ of gas scrubbed. Scrubbing efficiency was maintained at a level of 98 to 99%. At a pH of 4.0, 100% of the effluent stream is in the form of $NaHSO_3$, equivalent to the use of one mole of NaOH per mol of $SO_2$ removed. In these tests, the actual mols of active sodium to mols of $SO_2$ was 1.14. Depending on caustic strength and equilibrium pH, removal efficiencies greater than 99% can be maintained at low L/G ratios, i.e. $\leq 1.0$ USgal/1000 ft$^3$.

A series of experiments was conducted to study the effect of effluent pH and L/G ratio. The results are presented in the following Table 2:

TABLE 2

Removal of $SO_2$ Using NaOH

| Test # | Effluent pH | # of Nozzles | L/G (USgpm/ MCFM) | Air Velocity (ft/sec) | $SO_2$ Inlet (ppmv) | Removal Efficiency (%) |
|---|---|---|---|---|---|---|
| 1 | 4 | 2 | 0.7 | 11 | 1000 | 75 |
| 2 | 3.5 | 2 | 1.2 | 11 | 1000 | 86 |
| 3 | 4 | 2 | 0.85 | 11 | 1000 | 92 |
| 4 | 4 | 2 | 1.1 | 11 | 1000 | 99 |
| 5 | 4 | 2 | 2.3 | 11 | 1000 | 99 |

Example 4

This Example illustrates bleach plant off-gas treatment.

Bleach plant emissions contain both chlorine ($Cl_2$) and chlorine dioxide ($ClO_2$). Both are oxidizing agents although $ClO_2$ is a much stronger oxidizing agent than $Cl_2$. E filtrate, a waste product from bleach plants and available in large quantities, contains some residual caustic as well as lignins that are readily oxidized by $ClO_2$. This material has been used as the standard for $Cl_2$ and $ClO_2$ removal for years using packed bed scrubbers. Unfortunately, rarely does the use of E filtrate meet the new more demanding regulations for $Cl_2$ and $ClO_2$ removal. In addition, E filtrate often contains fibers that tend to plug the packing of the packed bed scrubbers, resulting in costly shut-downs to remove and replace the plugged packing.

Recently, to enable pulp mills to meet the new regulations, weak wash, a causticized mixture of $Na_2S$ and sulfites, has been tested to treat bleach plant emissions. Using a parallel flow system of sprays as described herein and an L/G ratio of only about 2 USgal/1000 ft$^3$ of gas scrubbed, the required results were achieved (which is with considerably less liquid flow than that required for E filtrate to achieve poorer results). White liquor can also be used to remove $Cl_2$ and $ClO_2$ from bleach plants, but due to its higher cost, normally would only be used to supplement E filtrate or weak wash.

A combination of $SO_2$ and NaOH has recently been successfully tested as the active reagents, the $SO_2$ acting as the $ClO_2$ reducing agent and the caustic to neutralize the $Cl_2$ and resulting acids.

The parallel flow spray technology described herein can be used in horizontal or vertical ducts using gas velocities ranging from 10 to ~40 fps with any of the above chemical systems and meet the required emission limits.

Experimental data are presented in the following Table 3:

TABLE 3

Parallel Flow in Bleach Plant Absorbers

| Test # | Duct Diameter (ft) | # of Nozzles | L/G (USgpm/MCFM) | Air Velocity (ft/sec) | Removal Efficiency (%) |
| --- | --- | --- | --- | --- | --- |
| 1* | 6 | 6 | 2.1 | 24 | >99 |
| 2* | 18 | 4 | 10.0 | 15 | 97-99 |
| 3** | 4 | 5 | 6.0 | 10 | >99 |
| 4** | 7 | 5 | 7.7 | 23 | 96 |
| 5** | 5 | 8 | 6.4 | 47 | 95 |
| 6** | 4 | 7 | 7.1 | 37 | 99 |

*with recycle
**with E filtrate

SUMMARY OF DISCLOSURE

In summary of this disclosure, the present invention provides a novel procedure for effecting the removal of solute gases from gas stream containing the same using fine droplet sprays in which the absorbent media is fed in parallel to at least two dual-fluid spray nozzles located in a duct through which a gas stream containing solute gas passes. Modifications are possible within the scope of this invention.

What we claim is:

1. A method for the removal of a solute gas from a gas stream containing the same using an absorbing medium for said solute gas, which comprises:

passing said gas stream through an elongate conduit having an inlet thereto and an outlet therefrom;

feeding said absorbing medium in parallel to at least two dual-fluid spray nozzles located in longitudinally spaced-apart relationship in said conduit;

injecting said parallel-fed absorbing medium from each of said spray nozzles by atomizing gas to form a spray pattern of said absorbing medium in said conduit from each nozzle and containing liquid droplets ranging in size from about 5 to about 150 microns;

absorbing solute gas from said gas stream into said liquid droplets of absorbing medium in each said spray pattern in said conduit; and agglomerating said liquid droplets containing absorbed solute gas at said outlet of said conduit to remove entrained liquid droplets from said gas stream and form a liquid stream containing absorbed solute gas.

2. The method of claim 1 wherein said absorbing medium comprises a regenerable aqueous medium in which said solute gas may be absorbed to form a solute gas-laden stream a said liquid stream and from which said solute gas may be desorbed to regenerate said regenerable aqueous medium.

3. The method of claim 1 wherein at least three dual-fluid spray nozzles are located in longitudinally space-apart relationship in said conduit and are fed in parallel flow with said absorbing medium.

4. The method of claim 1 wherein:

said absorbing medium is fed in parallel to a first at least two dual-fluid spray nozzles located in a downstream solute gas-absorbing zone to absorb solute gas from said gas stream into said liquid droplets in each said spray pattern in said downstream zone, said agglomeration of said liquid droplets containing absorbed solute gas at said outlet of said conduit forms a partially-loaded absorbing medium, and including:

feeding said partially-loaded absorbing medium in parallel to a second at least two dual-fluid spray nozzles located in longitudinally spaced-apart relationship in an upstream solute gas-absorbing zone in said conduit;

injecting said parallel-fed partially-loaded absorbing medium from which said spray nozzle in said second at least two spray nozzles to form a spray pattern from each nozzle of said partially-loaded absorbing medium in said upstream solute gas-absorbing zone in said conduit and containing liquid droplets ranging in size from about 5 to about 150 microns;

absorbing solute gas from said gas stream into said liquid droplets of partially-laden absorbing medium in each said spray pattern in said upstream gas-absorbing zone; and agglomerating said liquid droplets of partially-laden absorbing medium at the downstream end of said upstream gas-absorbing zone to remove entrained liquid droplets from said gas stream exiting said upstream gas-absorbing zone and form a fully-loaded absorbing medium.

5. The method of claim 1 wherein said elongate conduit is provided in a vertical orientation with said inlet end at the lower end thereof and said dual-fluid spray nozzles are arranged to form said spray patterns countercurrent to the upward flow of said gas stream through said conduit.

6. The method of claim 1 wherein said liquid droplets are sized from about 30 to 60 microns.

7. The method of claim 1 wherein said atomizing gas is applied to the dual-fluid nozzles at a pressure of about 20 to about 70 psi.

8. The method of claim 7 wherein said pressure is about 20 to about 70 psi.

9. A method for the removal of a solute gas, which is an acid gas selected from the group consisting of $SO_2$, $H_2S$, $Cl_2$, $ClO_2$, $NO_x$, HCl, HF, $SO_2$, $CO_2$ and mixtures thereof, from a gas stream containing the same using an absorbing medium for said solute gas, which is a regenerable alkaline aqueous medium, which comprises:

passing said gas stream through an elongate conduit having an inlet thereto and an outlet therefrom;

feeding said absorbing medium in parallel to at least two dual-fluid spray nozzles located in longitudinally spaced-apart relationship in said conduit;

injecting said parallel-fed absorbing medium from each of said spray nozzles by atomizing gas to form a spray pattern of said absorbing medium in said conduit from each nozzle and containing liquid droplets ranging in size from about 5 to about 150 microns;

absorbing solute gas from said gas stream into said liquid droplets of absorbing medium in each said spray pattern in said conduit; and agglomerating said liquid droplets containing absorbed solute gas at said outlet of said conduit to remove entrained liquid droplets from said gas stream and form a liquid stream containing absorbed solute gas.

10. A method for the removal of a solute gas, which is $SO_2$, from a gas stream containing the same, which is substantially saturated with water vapor, using an absorbing medium for said solute gas, which is a regenerable aqueous solvent, which is an aqueous solution of an amine, diamine or monosalt of a diamine in which the $SO_2$ may be dissolved and from which the $SO_2$ may be subsequently desorbed, which comprises:

passing said gas stream through an elongate conduit having an inlet thereto and an outlet therefrom;

feeding said absorbing medium in parallel to at least two dual-fluid spray nozzles located in longitudinally spaced-apart relationship in said conduit;

injecting said parallel-fed absorbing medium from each of said spray nozzles by atomizing gas to form a spray pattern of said absorbing medium in said conduit from each nozzle and containing liquid droplets ranging in size from about 5 to about 150 microns;

absorbing solute gas from said gas stream into said liquid droplets of said absorbing medium in each said spray pattern in said conduit; and agglomerating said liquid droplets containing absorbed solute gas at said outlet of said conduit to remove entrained liquid droplets from said gas stream and form a liquid stream containing absorbed solute gas.

11. A method for the removal of a solute gas comprising $cl_2$ and $ClO_2$ contained in a pulp mill bleach plant emission stream using an absorbing medium for said solute gas, which is selected from pulp mill E filtrate, weak wash, white liquor and mixtures thereof, which comprises:

passing said gas stream through an elongate conduit having an inlet thereto and an outlet therefrom;

feeding said absorbing medium in parallel to at least two dual-fluid Spray nozzles located in longitudinally spaced-apart relationship in said conduit;

injecting said parallel-fed absorbing medium from each of said spray nozzles by atomizing gas to form a spray pattern of said absorbing medium in said conduit from each nozzle and containing liquid droplets ranging in size from about 5 to about 150 microns;

absorbing solute gas from said gas stream into said liquid droplets of absorbing medium in each said spray pattern in said conduit; and agglomerating said liquid droplets containing absorbed solute gas at said outlet of said conduit to remove entrained liquid droplets from said gas stream and form a liquid stream containing absorbed solute gas.

12. A method for the removal of a solute gas, which is selected from $H_2S$, $CO_2$ and mixtures thereof, from a gas stream containing the same using an absorbing medium for said solute gas which is a regenerable aqueous alkanolamine solution, which comprises:

passing said gas stream through an elongate conduit having an inlet thereto and an outlet therefrom;

feeding said absorbing medium in parallel to at least two dual-fluid spray nozzle located in longitudinally spaced-apart relationship in said conduit;

injecting said parallel-fed absorbing medium from each of said spray nozzles by atomizing as to form a spray pattern of said absorbing medium in said conduit from each pattern of containing liquid droplets ranging in size from about 5 to about 150 microns;

absorbing solute from said gas stream into said liquid droplets of absorbing medium in each said spray pattern in said conduit; and agglomerating said liquid droplets containing absorbed solute gas at said outlet of said conduit to remove entrained liquid droplets from said gas stream and form a liquid stream containing absorbed solute gas.

13. A method for the removal of a solute gas, which is $SO_2$, from a gas stream containing the same, which is substantially saturated with water vapor, using an absorbing medium for said solute gas, which comprises an aqueous solution of an amine, diamine or monosalt of a diamine in which the $SO_2$ may be dissolved and from which the $SO_2$ may subsequently be desorbed, which comprises:

passing said gas stream through an elongate conduit having an inlet thereto and an outlet therefrom;

feeding said absorbing medium in parallel to a first at least two dual-fluid spray nozzles located in longitudinally spaced-apart relationship in a downstream solute gas-absorbing zone in said conduit;

injecting said parallel-fed absorbing medium from each of spray nozzles by atomizing gas to form a spray pattern of said absorbing medium in said downstream solute gas-absorbing zone from each nozzle and containing liquid droplets ranging in size from about 5 to about 150 microns;

absorbing solute gas from said gas stream into said liquid droplets in each said spray pattern in said downstream solute gas-absorbing zone;

agglomerating said liquid droplets contain absorbed solute gas at said output of said conduit to remove entrained liquid droplets from said gas stream and form a partially-loaded absorbing means;

feeding said partially-loaded absorbing medium in parallel to a second at least two dual-fluid spray nozzles located in longitudinally spaced-apart relationship in an upstream solute gas-absorbing zone in said conduit;

injecting said parallel-fed partially-loaded absorbing medium from which said spray nozzle in said second at least two spray nozzles to form a spray pattern from each nozzle of said partially-loaded absorbing medium in said upstream solute gas-absorbing zone in said conduit and containing liquid droplets ranging in size from about 5 to about 150 microns;

absorbing solute gas from said gas stream into said liquid droplets of partially-laden absorbing medium in each said spray pattern in said upstream gas-absorbing zone; and agglomerating said liquid droplets of partially-laden absorbing medium at the downstream end of said upstream gas-absorbing zone to remove entrained liquid droplets from said gas stream exiting said upstream gas-absorbing zone and form a fully-loaded absorbing medium.

* * * * *